United States Patent
Hu (10) Patent No.: US 11,937,039 B2
(45) Date of Patent: Mar. 19, 2024

(54) TWS EARPHONE, METHOD AND APPARATUS FOR REDUCING EARPHONE ENERGY CONSUMPTION, AND MEDIUM

(71) Applicant: GOERTEK INC., Shandong (CN)

(72) Inventor: Dezheng Hu, Shandong (CN)

(73) Assignee: GOERTEK INC., Shandong (CN)

( * ) Notice: Subject to any disclaimer, the term of this patent is extended or adjusted under 35 U.S.C. 154(b) by 220 days.

(21) Appl. No.: 17/624,166

(22) PCT Filed: Dec. 31, 2019

(86) PCT No.: PCT/CN2019/130242
§ 371 (c)(1),
(2) Date: Dec. 30, 2021

(87) PCT Pub. No.: WO2021/128405
PCT Pub. Date: Jul. 1, 2021

(65) Prior Publication Data
US 2022/0360880 A1 Nov. 10, 2022

(30) Foreign Application Priority Data
Dec. 25, 2019 (CN) .......................... 201911358344.9

(51) Int. Cl.
H04R 1/10 (2006.01)
G06F 1/3206 (2019.01)
G06F 1/3287 (2019.01)

(52) U.S. Cl.
CPC .......... *H04R 1/1041* (2013.01); *G06F 1/3206* (2013.01); *G06F 1/3287* (2013.01);
(Continued)

(58) Field of Classification Search
CPC .............. H04R 1/1041; H04R 1/1025; H04R 2460/03; H04R 2460/17; H04R 2420/07;
(Continued)

(56) References Cited

U.S. PATENT DOCUMENTS

| 8,891,800 B1 * | 11/2014 | Shaffer | ................ H04R 1/1025 381/384 |
| 9,590,680 B1 * | 3/2017 | Reuss | .................... H04B 1/385 |

(Continued)

FOREIGN PATENT DOCUMENTS

| CN | 105554616 | 5/2016 |
| CN | 108650668 | 10/2018 |

(Continued)

OTHER PUBLICATIONS

Notice to Grant issued in related Chinese Application No. 201911358344.9; dated Nov. 30, 2020; 3 pgs.
(Continued)

*Primary Examiner* — Xu Mei
(74) *Attorney, Agent, or Firm* — HAUPTMAN HAM, LLP (57) ABSTRACT

Disclosed are a TWS earphone, a method and apparatus for reducing earphone energy consumption, and a computer-readable storage medium. The method for reducing earphone energy consumption comprises: determining whether a target earphone is in an off-ear state and is not placed in a charging case; if so, acquiring a timekeeping duration since the target earphone is taken off of an ear; determining whether the timekeeping duration exceeds a first preset threshold value; and if the timekeeping duration exceeds the first preset threshold value, performing energy consumption reduction processing on the earphone. According to the present application, the duration since an earphone is taken off of an ear is evaluated for the earphone that is taken off of the ear and is not placed in a charging case, so as to perform energy consumption reduction processing on the earphone that has been taken off of the ear for a relatively long duration, such that unnecessary power consumption of the earphone when same is in a not-in-use state can be (Continued)

effectively reduced, and the effective service time of the earphone after charging is prolonged.

14 Claims, 3 Drawing Sheets

(52) U.S. Cl.
 CPC ........ *H04R 1/1025* (2013.01); *H04R 2460/03* (2013.01); *H04R 2460/17* (2013.01)

(58) Field of Classification Search
 CPC ........ H04R 5/033; H04R 1/1091; H04R 1/10; G06F 1/3206; G06F 1/3287; G06F 1/3209; G06F 1/3215; G06F 1/3228; G06F 1/3231; G06F 1/3278; Y02D 30/70
 USPC .......................................................... 381/74
 See application file for complete search history.

(56) References Cited

U.S. PATENT DOCUMENTS

| | | | |
|---|---|---|---|
| 9,800,966 B2* | 10/2017 | Hirsch | H04R 1/1025 |
| 10,104,463 B2 | 10/2018 | Kim et al. | |
| 10,674,247 B2* | 6/2020 | Song | G06V 40/10 |
| 10,939,193 B1 | 3/2021 | Cao | H04R 1/1025 |
| 11,089,429 B1* | 8/2021 | Trivedi | H04R 1/1041 |
| 11,197,142 B1* | 12/2021 | Kontopidis | H04R 1/1025 |
| 11,399,227 B2* | 7/2022 | Onizuka | H02J 7/0047 |
| 2014/0314247 A1* | 10/2014 | Zhang | H04R 1/1041 381/74 |
| 2019/0335267 A1* | 10/2019 | Wurtz | H04R 1/1008 |
| 2019/0379216 A1 | 12/2019 | Yoon et al. | |
| 2019/0387304 A1 | 12/2019 | Song et al. | |
| 2020/0007977 A1 | 1/2020 | Gong et al. | |
| 2021/0136839 A1 | 5/2021 | Wang | |
| 2023/0034046 A1* | 2/2023 | Hu | H04S 7/304 |
| 2023/0061521 A1* | 3/2023 | Sun | H04R 1/1016 |

FOREIGN PATENT DOCUMENTS

| | | |
|---|---|---|
| CN | 108882210 | 11/2018 |
| CN | 108989931 | 12/2018 |
| CN | 109040887 | 12/2018 |
| CN | 109121048 | 1/2019 |
| CN | 109511035 | 3/2019 |
| CN | 109743654 A | 5/2019 |
| CN | 110087161 | 8/2019 |
| CN | 110149567 | 8/2019 |
| CN | 110191442 A | 8/2019 |
| CN | 110213685 | 9/2019 |
| CN | 110572731 | 12/2019 |
| WO | WO2018117592 | 6/2018 |

OTHER PUBLICATIONS

International Search Report issued in PCT/CN2019/130242 dated Aug. 28, 2020.

* cited by examiner

TWS EARPHONE, METHOD AND APPARATUS FOR REDUCING EARPHONE ENERGY CONSUMPTION, AND MEDIUM

This application is a 371 Applications of International Application No. PCT/CN2019/130242, filed on Dec. 31, 2019, titled "TWS EARPHONE, METHOD AND APPARATUS FOR REDUCING EARPHONE ENERGY CONSUMPTION, AND MEDIUM", which claims the benefit of and priority to Chinese Patent Application No. 201911358344.9, titled "TWS EARPHONE, METHOD AND APPARATUS FOR REDUCING EARPHONE ENERGY CONSUMPTION, AND MEDIUM", filed on Dec. 25, 2019, with the China National Intellectual Property Administration, the disclosures of which are both incorporated herein by reference in their entirety.

FIELD

The present disclosure relates to the field of electronic technology, and in particular to a TWS earphone, a method and an apparatus for reducing energy consumption of an earphone, and a computer readable storage medium.

BACKGROUND

With development of electronic technology, TWS (True Wireless Stereo) earphones are widely used in daily life. When using TWS earphones, a user may often wear only one of the earphones. The other earphone may not be placed into a charging case immediately after being taken off, and may still maintain a Bluetooth link connection. In this case, the removed earphone still consumes power, which may cause the earphone to run out of power and thereby reduce user experience.

In view of the above, providing a solution to the above-mentioned technical problems is desired for those skilled in the art.

SUMMARY

An objective of the present disclosure is to provide a TWS earphone, a method and an apparatus for reducing energy consumption of an earphone, a computer readable storage medium, in order to reduce unnecessary power consumption and increase effective use time for the earphone after being charged.

To solve the above technical problems, a method for reducing energy consumption of an earphone is provided according to a first aspect of the present disclosure. The method includes: determining whether a target earphone is in off-ear state and is placed in a charging case or not; obtaining, in a case where the target earphone is in off-ear state and is not placed in the charging case, a duration since the target earphone is off ear; determining whether the duration exceeds a first preset threshold; and performing energy consumption reduction processing on the earphone, in a case where the duration exceeds the first preset threshold.

Optionally, the performing energy consumption reduction processing on the earphone includes: determining whether the duration exceeds a second preset threshold, where the second preset threshold is greater than the first preset threshold; generating a shutdown instruction in a case where the duration exceeds the second preset threshold; and generating a sleep instruction in a case where the duration does not exceed the second preset threshold.

Optionally, after determining that the target earphone is in off-ear state and is not placed in the charging case, and before the obtaining a duration since the target earphone is off ear, the method further includes: determining whether a communication link with another earphone is maintained; generating a shutdown instruction in a case where the communication link is disconnected; and performing the step of obtaining a duration since the target earphone is off ear and subsequent steps in a case where the communication link is not disconnected.

Optionally, after determining that the communication link is not disconnected, and before the obtaining a duration since the target earphone is off ear, the method further includes: determining whether the target earphone functions as a primary earphone; performing the step of obtaining a duration since the target earphone is off ear and subsequent steps in a case where the target earphone functions as a secondary earphone; and interchanging, in a case where the target earphone functions as a primary earphone, a primary/secondary status of the target earphone with the other earphone, and performing the step of obtaining a duration since the target earphone is off ear and subsequent steps.

Optionally, after determining that the target earphone functions as a primary earphone, and before the interchanging a primary/secondary status of the target earphone with the other earphone, the method further includes: determining whether the other earphone is in off-ear state by communication through the communication link; performing the step of obtaining a duration since the target earphone is off ear and subsequent steps in a case where the other earphone is in off-ear state; and performing the step of interchanging a primary/secondary status of the target earphone with the other earphone and subsequent steps in a case where the other earphone is in on-ear state.

Optionally, after the determining whether the duration exceeds a first preset threshold, the method further includes: re-performing, after waiting for a preset interval time, the step of determining whether a target earphone is in off-ear state and is placed in a charging case or not and subsequent steps, in a case where the duration does not exceed the first preset threshold.

In a second aspect, an apparatus for reducing energy consumption of an earphone is provided according to the present disclosure. The apparatus includes a state determination module, a duration determination module, and an energy consumption reduction processing module. The state determination module is configured to: determine whether a target earphone is in off-ear state and is placed in a charging case or not; and obtain, in a case where the target earphone is in off-ear state and is not placed in the charging case, a duration since the target earphone is off ear. The duration determination module is configured to determine whether the duration exceeds a first preset threshold. The energy consumption reduction processing module is configured to perform energy consumption reduction processing on the earphone, in a case where the duration determination module determines that the duration exceeds the first preset threshold.

Optionally, the duration determination module is further configured to determine whether the duration exceeds a second preset threshold after determining that the duration exceeds the first preset threshold, where the second preset threshold is greater than the first preset threshold.

The energy consumption reduction processing module is specifically configured to: generate a shutdown instruction in a case where the duration exceeds the second preset threshold; and generate a sleep instruction in a case where the duration does not exceed the second preset threshold.

Optionally, the state determination module is further configured to: determine whether a communication link with another earphone is maintained, after determining that the target earphone is in off-ear state and is not placed in the charging case, and before obtaining the duration since the target earphone is off ear; generate a shutdown instruction in a case where the communication link is disconnected; and obtain the duration since the target earphone is off ear, in a case where the communication link is not disconnected.

Optionally, the state determination module is further configured to: determine whether the target earphone functions as a primary earphone, after determining that the communication link is not disconnected, and before obtaining the duration since the target earphone is off ear; obtain the duration since the target earphone is off ear in a case where the target earphone functions as a secondary earphone; and interchanging, in a case where the target earphone functions as a primary earphone, a primary/secondary status of the target earphone with the other earphone and obtain the duration since the target earphone is off ear.

Optionally, the state determination module is further configured to: determine whether the other earphone is in off-ear state by communication through the communication link, after determining that the target earphone functions as a primary earphone, and before the interchanging a primary/secondary status of the target earphone with the other earphone; obtain the duration since the target earphone is off ear in a case where the other earphone is in off-ear state; and interchange the primary/secondary status of the target earphone with the other earphone in a case where the other earphone is in on-ear state.

Optionally, the state determination module is further configured to re-determine, after waiting for a preset interval time, whether the target earphone is in off-ear state and is placed in the charging case or not, in a case where the duration determination module determines that the duration does not exceed the first preset threshold.

A TWS earphone is further provided according to a third aspect of the present disclosure. The TWS earphone includes: a memory configured to store a computer program; and a processor configured to execute the computer program to perform steps of the method for reducing energy consumption of an earphone as described above.

A computer readable storage medium is further provided according to a fourth aspect of the present disclosure. The computer readable storage medium stores a computer program. The computer program, when being executed by a processor, implements steps of the method for reducing energy consumption of an earphone as described above.

The method for reducing energy consumption of an earphone provided in the present disclosure includes: determining whether a target earphone is in off-ear state and is placed in a charging case or not; obtain, in a case where the target earphone is in off-ear state and is not placed in the charging case, a duration since the target earphone is off ear; determining whether the duration exceeds a first preset threshold; and performing energy consumption reduction processing on the earphone, in a case where the duration exceeds the first preset threshold.

It can be seen that in the present disclosure, for an earphone that is off ear but is not placed in a charging case, a duration since the earphone is off ear is determined, and thereby energy consumption reduction processing is performed on an earphone with a long off-ear duration. In this way, the method can effectively reduce unnecessary power consumption when the earphone is not in use and increase effective use time for the earphone after being charged. The apparatus for reducing energy consumption of an earphone, the electronic device, and the computer readable storage medium according to the present disclosure also have the above-mentioned beneficial effects.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some drawings for the present disclosure, and other drawings may be obtained by those skilled in the art based on the provided drawings without any creative effort.

DETAILED DESCRIPTION

Technical solutions in embodiments of the present disclosure are clearly and completely described below in conjunction with drawings of the embodiments of the present disclosure. Apparently, the embodiments described in the following are only some rather than all of the embodiments of the present disclosure. All other embodiments obtained by a person of ordinary skill in the art based on the embodiments of the present disclosure without any creative effort shall fall within the protection scope of the present disclosure.

An objective of the present disclosure is to provide a TWS earphone, a method and an apparatus for reducing energy consumption of an earphone, a computer readable storage medium, in order to reduce unnecessary power consumption and increase effective use time for the earphone after being charged.

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by a person of ordinary skill in the art based on the embodiments of the present disclosure without any creative effort shall fall within the protection scope of the present disclosure.

With development of electronic technology, TWS (True Wireless Stereo) earphones are widely used in daily life. When using TWS earphone, a user may often wear only one of the earphones. The other earphone may not be placed into a charging case immediately after being taken off, and may still maintain a Bluetooth link connection. In this case, the removed earphone still consumes power, which may cause the earphone to run out of power and thereby reduce user experience. In view of this, a method for reducing energy consumption of an earphone is provided in the present disclosure, which can solve the problems effectively.

Figure 1:
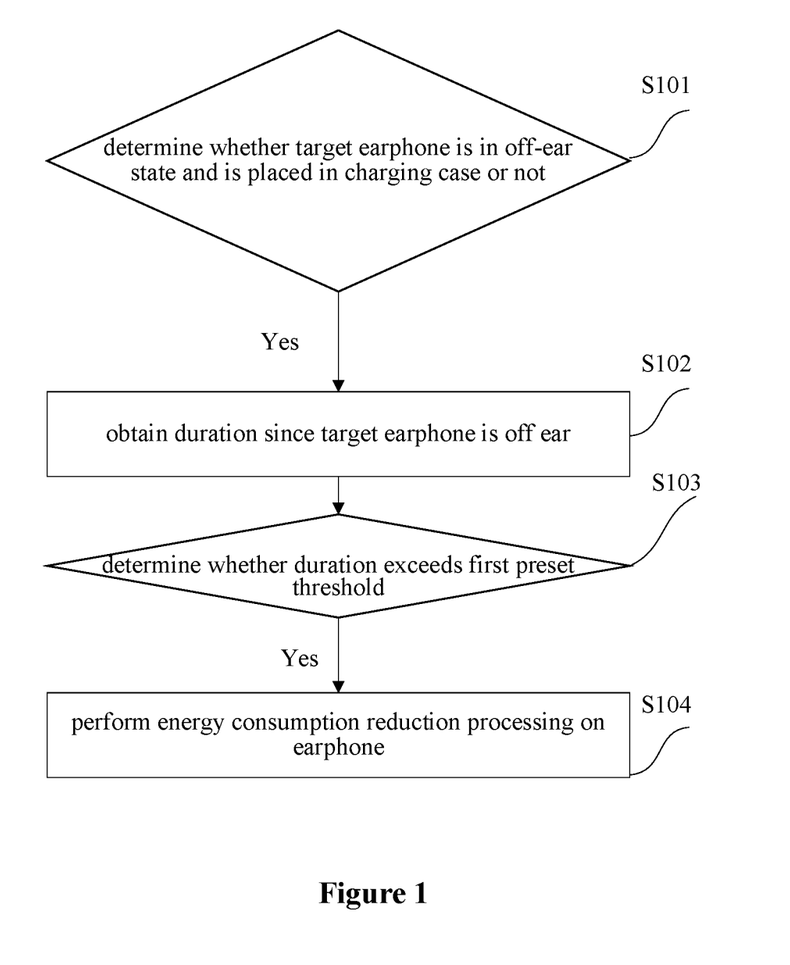
FIG. 1 is a flow chart of a method for reducing energy consumption of an earphone according to an embodiment of the present disclosure.

Referring to FIG. 1, a method for reducing energy consumption of an earphone is provided according to an embodiment of the present disclosure. The method mainly includes the following steps S101 to S104.

In step S101, it is determined whether a target earphone is in off-ear state and is placed in a charging case or not, and the method proceeds to step S102 in a case where the target earphone is in off-ear state and is not placed in the charging case.

It is first noted that, the method according to the embodiment is applicable to a single earphone, which is referred to as a target earphone. Particularly, the method is applicable to a single TWS earphone.

The target earphone is taken as a processing target, and a state of the target earphone is first detected, including whether the target earphone is off ear and is placed in a charging case or not.

Whether the target earphone is in off-ear state may be determined according to a detection signal of a relevant sensor in the target earphone based on various detection principles. For example, whether the earphone is on ear may be determined based on acceleration of the target earphone, or conductivity of the target earphone.

Whether the target earphone is placed in a charging case may be determined by detecting a charging GPIO signal of the target earphone, or according to a detection signal of another relevant sensor in the target earphone, such as a Hall sensor, an infrared sensor or the like.

In step S102, a duration since the target earphone is off ear is obtained.

It is noted that in the method for reducing energy consumption of an earphone provided in the embodiment, the target earphone includes a built-in timer, which is automatically triggered to start timing once the earphone is off ear.

In step S103, it is determined whether the duration exceeds a first preset threshold; if so, the method proceeds to step S104.

Specifically, in a case where it is determined that the target earphone is off ear and is not placed in the charging case, a duration since the target earphone is off ear may be further determined, in order to perform energy consumption reduction processing in a case where the duration exceeds the first preset threshold.

It is readily understandable that those skilled in the art should set a value of the first preset threshold reasonably, for example, 3 minutes, to prevent a situation in which the energy consumption reduction processing is performed on the earphone when a user temporally takes off the earphone for a short time (for example, just wearing the earphone onto the other ear) such that the user cannot use the earphone immediately after wearing the earphone again.

In step S104, energy consumption reduction processing is performed on the earphone.

Specifically, if it is determined in step S103 that the duration since the target earphone is off ear exceeds the first preset threshold, it indicates that the target earphone has been put aside and the user is unlikely to use the earphone again in a short period of time. Therefore, the energy consumption reduction processing may be performed on the earphone immediately.

The method for reducing energy consumption of an earphone provided in the embodiment of the present disclosure includes: determining whether a target earphone is in off-ear state and is placed in a charging case or not; obtain, in a case where the target earphone is in off-ear state and is not placed in the charging case, a duration since the target earphone is off ear; determining whether the duration exceeds a first preset threshold; and performing energy consumption reduction processing on the earphone, in a case where the duration exceeds the first preset threshold. It can be seen that in the present disclosure, for an earphone that is off ear but is not placed in a charging case, a duration since the earphone is off ear is determined, and thereby energy consumption reduction processing is performed on an earphone with a long off-ear duration. In this way, the method can effectively reduce unnecessary power consumption when the earphone is not in use and increase effective use time for the earphone after being charged.

As a specific embodiment based on the above embodiment, in the method for reducing energy consumption of an earphone, the energy consumption reduction processing on the earphone in step S104 may specifically include: determining whether the duration exceeds a second preset threshold, where the second preset threshold is greater than the first preset threshold; generating a shutdown instruction in a case where the duration exceeds the second preset threshold; and generating a sleep instruction in a case where the duration does not exceed the second preset threshold.

Specifically in this embodiment, the energy consumption reduction processing may be a shutdown operation if the duration since the target earphone is off ear exceeds the second preset threshold; and the energy consumption reduction processing may be a sleep operation if the duration since the target earphone is off ear is between the first preset threshold and the second preset threshold.

Further, the target earphone which is shut off may be automatically turned on by putting the earphone in the charging case; and the target earphone which is sleeping may be woken up when a relevant sensor detects that the user is wearing the earphone again.

Specifically, the second preset threshold may be set to 60 minutes.

As a specific embodiment based on the above embodiments, in the method for reducing energy consumption of an earphone, after determining that the target earphone is in off-ear state and is not placed in the charging case, and before the obtaining a duration since the target earphone is off ear, the method further includes: determining whether a communication link with another earphone is maintained; generating a shutdown instruction in a case where the communication link is disconnected; and performing the step of obtaining a duration since the target earphone is off ear and subsequent steps in a case where the communication link is not disconnected.

It is easy to understand that a pair of TWS earphones may maintain a communication link connection therebetween via Bluetooth. If the off-ear target earphone is not connected to the other earphone through the communication link, the target earphone may be already out of a communication range and cannot continue to provide the user with sound playback service, and therefore the target earphone can be directly controlled to shut down. If the communication link between the target earphone and the other earphone is not disconnected, the duration since the target earphone is off ear may be determined.

As a specific embodiment based on the above embodiments, in the method for reducing energy consumption of an earphone, after determining that the communication link is not disconnected, and before the obtaining a duration since the target earphone is off ear, the method further includes: determining whether the target earphone functions as a primary earphone; performing the step of obtaining a duration since the target earphone is off ear and subsequent steps in a case where the target earphone functions as a secondary earphone; and interchanging, in a case where the target earphone functions as a primary earphone, a primary/secondary status of the target earphone with the other earphone, and performing the step of obtaining a duration since the target earphone is off ear and subsequent steps.

Specifically, since two earphones play different roles as a primary earphone and a secondary earphone respectively, it is determined in this embodiment whether the target earphone functions as a primary earphone or a secondary earphone, before determining the duration since the target earphone is off ear, so that the primary/secondary status of the target earphone can be changed before the energy consumption reduction processing.

As a specific embodiment based on the above embodiments, in the method for reducing energy consumption of an earphone, after determining that the target earphone functions as a primary earphone, and before the interchanging a primary/secondary status of the target earphone with the other earphone, the method further includes: determining whether the other earphone is in off-ear state by communication through the communication link; performing the step of obtaining a duration since the target earphone is off ear and subsequent steps in a case where the other earphone is in off-ear state; and performing the step of interchanging a primary/secondary status of the target earphone with the other earphone and subsequent steps in a case where the other earphone is in on-ear state.

Specifically, in a case where the target earphone is the primary earphone, if the other earphone, that is, the secondary earphone, is also taken off by the user, it is not necessary to switch the primary/secondary status. Therefore, in this embodiment, after determining that the target earphone functions as a primary earphone, it may also be determined whether the other earphone is on ear. If the other earphone is on ear, the primary/secondary status of the target earphone may be switched and then the off-ear duration of the target earphone may be determined. If the other earphone is off ear, the off-ear duration of the target earphone may be determined directly without switching the primary/secondary status of the target earphone.

It is easy to understand that the two earphones may obtain on-ear state information of each other when the communication link connection is maintained therebetween.

As a specific embodiment based on the above embodiments, in the method for reducing energy consumption of an earphone, after determining whether the duration exceeds the first preset threshold, the method further includes: re-performing, after waiting for a preset interval time, the step of determining whether a target earphone is in off-ear state and is placed in a charging case or not and subsequent steps, in a case where the duration does not exceed the first preset threshold.

Specifically, if the duration does not exceed the first preset threshold, it indicates that the target earphone has just been taken off and is more likely to be re-activated by the user. Therefore, a current state of the target earphone may be maintained in this case, that is, energy consumption reduction processing is not performed on the target earphone currently. The method may proceed to step S101 again after waiting for a preset interval time to update the state of the target earphone and thereby re-determine whether to perform the energy consumption reduction processing on the target earphone.

Figure 2:
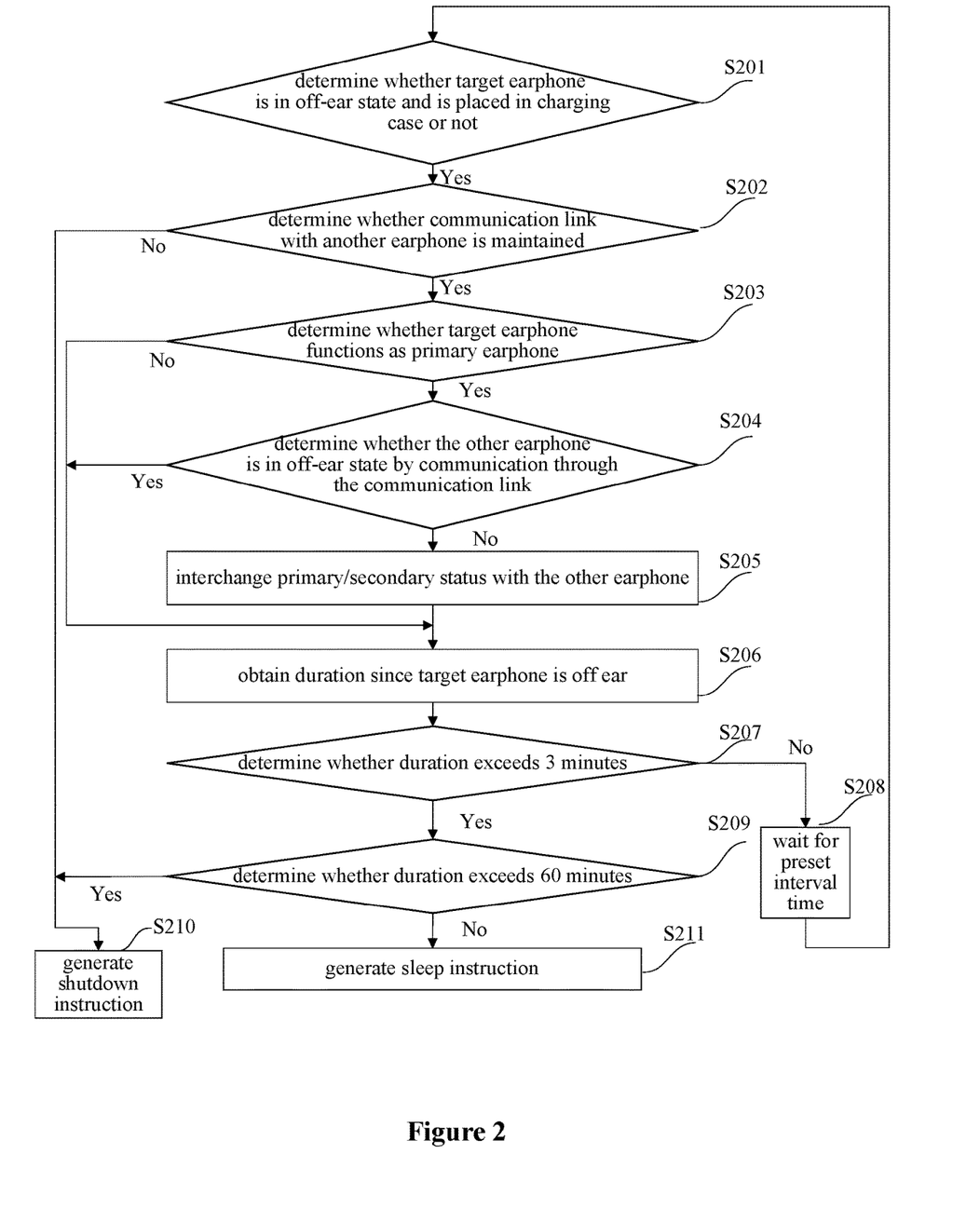
FIG. 2 is a flow chart of a method for reducing energy consumption of an earphone according to another embodiment of the present disclosure.

Reference may be made to FIG. 2 for the above description, which shows a method for reducing energy consumption of an earphone according to an embodiment of the present disclosure. The method includes the following steps S201 to S211.

In step S201, it is determined whether a target earphone is in off-ear state and is placed in a charging case or not, and the method proceeds to step S202 in a case where the target earphone is in off-ear state and is not placed in the charging case.

In step S202, it is determined whether a communication link with another earphone is maintained. If so, the method proceeds to step S203; otherwise, the method proceeds to step S210.

In step S203, it is determined whether the target earphone functions as a primary earphone. If so, the method proceeds to step S204; otherwise, the method proceeds to step S206.

In step S204, it is determined whether the other earphone is in off-ear state by communication through the communication link. If so, the method proceeds to step S206; otherwise, the method proceeds to step S205.

In step S205, a primary/secondary status of the target earphone is interchanged with the other earphone. The method then proceeds to step S206.

In step S206, a duration since the target earphone is off ear is obtained. The method then proceeds to step S207.

In step S207, it is determined whether the duration exceeds 3 minutes. If so, the method proceeds to step S209; otherwise, the method proceeds to step S208.

In step S208, the method waits for a preset interval time. The method then proceeds to step S201.

In step S209, it is determined whether the duration exceeds 60 minutes. If so, the method proceeds to step S210; otherwise, the method proceeds to step S211.

The second preset threshold is greater than the first preset threshold.

In step S210, a shutdown instruction is generated.

In step S211, a sleep instruction is generated.

Figure 3:
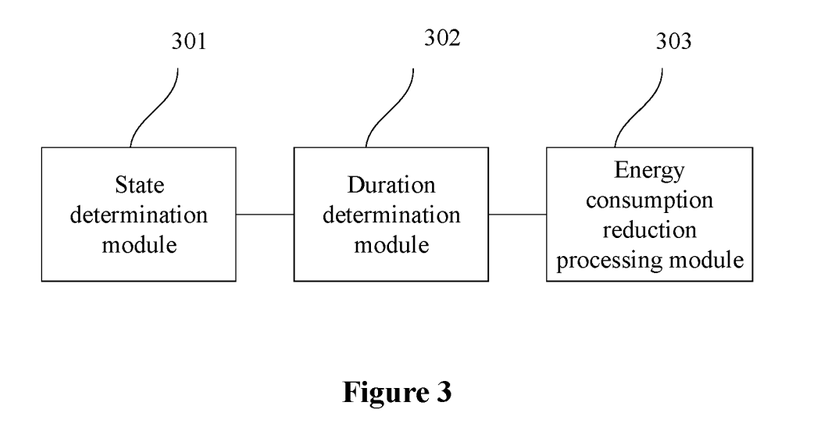
FIG. 3 is a block diagram showing a structure of an apparatus for reducing energy consumption of an earphone according to an embodiment of the present disclosure.

Referring to FIG. 3, an apparatus for reducing energy consumption of an earphone is provided according to an embodiment of the present disclosure. The apparatus mainly includes a state determination module 301, a duration determination module 302, an energy consumption reduction processing module 303.

The state determination module 301 is configured to: determine whether a target earphone is in off-ear state and is placed in a charging case or not; and obtain, in a case where the target earphone is in off-ear state and is not placed in the charging case, a duration since the target earphone is off ear.

The duration determination module 302 is configured to determine whether the duration exceeds a first preset threshold.

The energy consumption reduction processing module 303 is configured to perform energy consumption reduction processing on the earphone in a case where the duration determination module 302 determines that the duration exceeds the first preset threshold.

It can be seen that in the present disclosure, the apparatus for reducing energy consumption of an earphone determines, for an earphone that is not placed in a charging case after being taken off, a duration since the earphone is off ear, and thereby performs energy consumption reduction processing on an earphone with a long off-ear duration. In this way, the apparatus can effectively reduce unnecessary power consumption when the earphone is not in use and increase effective use time for the earphone after being charged.

Reference may be made to the foregoing detailed description of the method for reducing energy consumption of an earphone for specifics of the apparatus for reducing energy consumption of an earphone, which is not repeated herein.

As a specific embodiment based on the above embodiment, in the apparatus for reducing energy consumption of an earphone, the duration determination module 302 is further configured to determine whether the duration exceeds a second preset threshold after determining that the duration exceeds the first preset threshold, where the second preset threshold is greater than the first preset threshold.

The energy consumption reduction processing module 303 is specifically configured to: generate a shutdown instruction in a case where the duration exceeds the second preset threshold; and generate a sleep instruction in a case where the duration does not exceed the second preset threshold.

As a specific embodiment based on the above embodiments, in the apparatus for reducing energy consumption of an earphone, the state determination module 301 is further configured to: determine whether a communication link with another earphone is maintained, after determining that the target earphone is in off-ear state and is not placed in the charging case, and before obtaining the duration since the target earphone is off ear; generate a shutdown instruction in a case where the communication link is disconnected; and obtain the duration since the target earphone is off ear, in a case where the communication link is not disconnected.

As a specific embodiment based on the above embodiments, in the apparatus for reducing energy consumption of an earphone, the state determination module 301 is further configured to: determine whether the target earphone functions as a primary earphone, after determining that the communication link is not disconnected, and before obtaining the duration since the target earphone is off ear; obtain the duration since the target earphone is off ear in a case where the target earphone functions as a secondary earphone; and interchanging, in a case where the target earphone functions as a primary earphone, a primary/secondary status of the target earphone with the other earphone and obtain the duration since the target earphone is off ear.

As a specific embodiment based on the above embodiments, in the apparatus for reducing energy consumption of an earphone, the state determination module 301 is further configured to: determine whether the other earphone is in off-ear state by communication through the communication link, after determining that the target earphone functions as a primary earphone, and before the interchanging a primary/secondary status of the target earphone with the other earphone; obtain the duration since the target earphone is off ear in a case where the other earphone is in off-ear state; and interchange the primary/secondary status of the target earphone with the other earphone in a case where the other earphone is in on-ear state.

As a specific embodiment based on the above embodiments, in the apparatus for reducing energy consumption of an earphone, the state determination module 301 is further configured to: re-determine, after waiting for a preset interval time, whether the target earphone is in off-ear state and is placed in the charging case or not, in a case where the duration determination module 302 determines that the duration does not exceed the first preset threshold.

Figure 4:
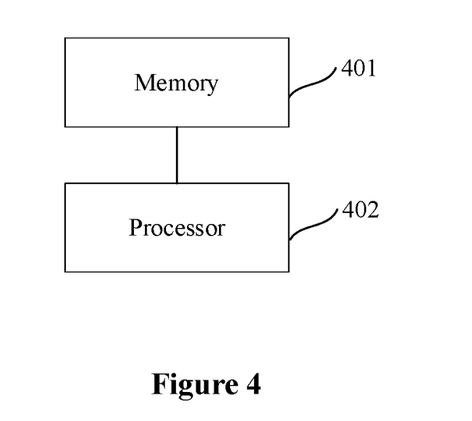
FIG. 4 is a block diagram showing a structure of a TWS earphone according to an embodiment of the present disclosure.

Referring to FIG. 4, a TWS earphone is provided according to an embodiment of the present disclosure. The TWS earphone includes a memory 401 configured to store a computer program and a processor 402 configured to execute the computer program to perform steps of the method for reducing energy consumption of an earphone as described in any one of the above embodiments.

A computer readable storage medium is further provided according to an embodiment of the present disclosure. The computer readable storage medium stores a computer program. The computer program, when being executed by a processor, implements steps of the method for reducing energy consumption of an earphone as described in any one of the above embodiments.

Reference may be made to the foregoing detailed description of the method for reducing energy consumption of an earphone for specifics of the electronic device and the computer readable storage medium as described above, which is not repeated herein.

The technical solutions provided in the present disclosure have been described in detail. Principles and embodiments of the present disclosure are described herein through specific examples. Description of the above embodiments is merely used to facilitate understanding the method and concept of the present disclosure. It should be noted that, various alternations and modifications may be made to the technical solutions of the present disclosure by those skilled in the art without departing from the principle of the present disclosure, which shall fall within the protection scope of the present disclosure.

The above embodiments in the specification are described in a progressive manner. Each embodiment focuses on describing its differences from other embodiments. Therefore, one embodiment can refer to other embodiments for the same or similar parts. Since the apparatus disclosed in the embodiment corresponds to the method disclosed in the embodiment, the description of the apparatus is relatively simple, and reference may be made to description of the method for relevant parts.

It is further understood by those skilled in the art that units and algorithm steps described in combination with the disclosed embodiments may be implemented by electronic hardware, computer software or a combination thereof. In order to clearly describe interchangeability of the hardware and the software, composition and steps of the various examples have been generally described in terms of function in the above description. Whether these functions are performed in hardware or software depends on the specific application and design constraints for the technical solution. Those skilled in the art may use different methods to implement the described functions for each particular application, and such implementation should not be regarded as going beyond the scope of the present disclosure.

Steps of the method or algorithm described in the embodiments herein may be directly implemented by hardware, a software module executed by a processor, or a combination thereof. The software module may reside in a Random Access Memory (RAM), an internal memory, a Read Only Memory (ROM), an Electrically Programmable ROM, an Electrically-Erasable Programmable ROM, a register, a hard disk, a removable disk drive, a CD-ROM, or any other storage medium known in the art.

It should be further noted that, the relational terms such as first, second or the like are only used herein to distinguish one entity or operation from another entity or operation, rather than requiring or implying that the actual relationship or order exists between the entities or operations. Furthermore, terms of "include", "comprise" or any other variants are intended to be non-exclusive. Further, the terms "include", "comprise" or any variant thereof are intended to encompass nonexclusive inclusion so that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The invention claimed is:

1. A method for reducing energy consumption of an earphone, comprising:
   determining whether a target earphone is in off-ear state and is placed in a charging case or not;
   obtaining, in a case where the target earphone is in off-ear state and is not placed in the charging case, a duration since the target earphone is off ear;
   determining whether the duration exceeds a first preset threshold; and
   performing energy consumption reduction processing on the target earphone, in a case where the duration exceeds the first preset threshold.

2. The method for reducing energy consumption of an earphone according to claim 1, wherein the performing energy consumption reduction processing on the earphone comprises:
   determining whether the duration exceeds a second preset threshold, wherein the second preset threshold is greater than the first preset threshold;
   generating a shutdown instruction in a case where the duration exceeds the second preset threshold; and
   generating a sleep instruction in a case where the duration does not exceed the second preset threshold.

3. The method for reducing energy consumption of an earphone according to claim 2, wherein after the determining whether the duration exceeds a first preset threshold, the method further comprises: re-performing, after waiting for a preset interval time, the step of determining whether a target earphone is in off-ear state and is placed in a charging case or not and subsequent steps, in a case where the duration does not exceed the first preset threshold.

4. The method for reducing energy consumption of an earphone according to claim 1, wherein after determining that the target earphone is in off-ear state and is not placed in the charging case, and before the obtaining a duration since the target earphone is off ear, the method further comprises:
   determining whether a communication link with another earphone is maintained;
   generating a shutdown instruction in a case where the communication link is disconnected; and
   performing the step of obtaining a duration since the target earphone is off ear and subsequent steps in a case where the communication link is not disconnected.

5. The method for reducing energy consumption of an earphone according to claim 4, wherein after determining that the communication link is not disconnected, and before the obtaining a duration since the target earphone is off ear, the method further comprises:
   determining whether the target earphone functions as a primary earphone;
   performing the step of obtaining a duration since the target earphone is off ear and subsequent steps in a case where the target earphone functions as a secondary earphone; and
   interchanging, in a case where the target earphone functions as a primary earphone, a primary/secondary status of the target earphone with the other earphone, and performing the step of obtaining a duration since the target earphone is off ear and subsequent steps.

6. The method for reducing energy consumption of an earphone according to claim 4, wherein after the determining whether the duration exceeds a first preset threshold, the method further comprises: re-performing, after waiting for a preset interval time, the step of determining whether a target earphone is in off-ear state and is placed in a charging case or not and subsequent steps, in a case where the duration does not exceed the first preset threshold.

7. The method for reducing energy consumption of an earphone according to claim 5, wherein after determining that the target earphone functions as a primary earphone, and before the interchanging a primary/secondary status of the target earphone with the other earphone, the method further comprises:
   determining whether the other earphone is in off-ear state by communication through the communication link;
   performing the step of obtaining a duration since the target earphone is off ear and subsequent steps in a case where the other earphone is in off-ear state; and
   performing the step of interchanging a primary/secondary status of the target earphone with the other earphone and subsequent steps in a case where the other earphone is in on-ear state.

8. The method for reducing energy consumption of an earphone according to claim 5, wherein after the determining whether the duration exceeds a first preset threshold, the method further comprises: re-performing, after waiting for a preset interval time, the step of determining whether a target earphone is in off-ear state and is placed in a charging case or not and subsequent steps, in a case where the duration does not exceed the first preset threshold.

9. The method for reducing energy consumption of an earphone according to claim 7, wherein after the determining whether the duration exceeds a first preset threshold, the method further comprises: re-performing, after waiting for a preset interval time, the step of determining whether a target earphone is in off-ear state and is placed in a charging case or not and subsequent steps, in a case where the duration does not exceed the first preset threshold.

10. The method for reducing energy consumption of an earphone according to claim 1, wherein after the determining whether the duration exceeds a first preset threshold, the method further comprises: re-performing, after waiting for a preset interval time, the step of determining whether a target earphone is in off-ear state and is placed in a charging case or not and subsequent steps, in a case where the duration does not exceed the first preset threshold.

11. A TWS earphone, comprising:
    a non-transitory memory configured to store a computer program; and
    a processor configured to execute the computer program to perform steps of the method for reducing energy consumption of an earphone according to claim 1.

12. A non-transitory computer readable storage medium storing a computer program, the computer program, when being executed by a processor, implementing steps of the method for reducing energy consumption of an earphone according to claim 1.

13. An apparatus for reducing energy consumption of an earphone, comprising:
    a state determination module configured to determine whether a target earphone is in off-ear state and is placed in a charging case or not, and obtain, in a case where the target earphone is in off-ear state and is not placed in the charging case, a duration since the target earphone is off ear;

a duration determination module configured to determine whether the duration exceeds a first preset threshold; and an energy consumption reduction processing module configured to perform energy consumption reduction processing on the target earphone, in a case where the duration determination module determines that the duration exceeds the first preset threshold.

14. The apparatus for reducing energy consumption of an earphone according to claim 13, wherein the duration determination module is further configured to determine whether the duration exceeds a second preset threshold after determining that the duration exceeds the first preset threshold, wherein the second preset threshold is greater than the first preset threshold; and the energy consumption reduction processing module is configured to generate a shutdown instruction in a case where the duration exceeds the second preset threshold, and generate a sleep instruction in a case where the duration does not exceed the second preset threshold.

* * * * *